United States Patent
Santinelli

(10) Patent No.: US 10,012,846 B1
(45) Date of Patent: Jul. 3, 2018

(54) RIMLESS EYE WEAR

(71) Applicant: Joseph Santinelli, Plainview, NY (US)

(72) Inventor: Joseph Santinelli, Plainview, NY (US)

(*) Notice: Subject to any disclaimer, the term of this patent is extended or adjusted under 35 U.S.C. 154(b) by 0 days.

(21) Appl. No.: 15/391,767

(22) Filed: Dec. 27, 2016

Related U.S. Application Data

(60) Provisional application No. 62/387,620, filed on Dec. 28, 2015.

(51) Int. Cl.
  *G02C 7/02* (2006.01)
  *G02C 1/04* (2006.01)
  *G02C 5/10* (2006.01)

(52) U.S. Cl.
  CPC .............. *G02C 1/04* (2013.01); *G02C 5/10* (2013.01); *G02C 2200/16* (2013.01)

(58) Field of Classification Search
  CPC .. G02C 2200/08; G02C 2200/06; G02C 7/02; G02C 9/04; G02C 1/10
  USPC ................. 351/106, 103, 86, 83, 90, 92
  See application file for complete search history.

(56) References Cited

U.S. PATENT DOCUMENTS

| | | | | |
|---|---|---|---|---|
| 2,384,867 | A * | 9/1945 | Williams | G02C 1/023 351/104 |
| 4,427,271 | A * | 1/1984 | Fogg | G02C 1/06 351/154 |
| 6,666,554 | B2 * | 12/2003 | Mulvey | A61F 9/025 351/106 |
| 2007/0216855 | A1 * | 9/2007 | Tabacchi | G02C 1/04 351/106 |

* cited by examiner

Primary Examiner — Hung Dang
(74) Attorney, Agent, or Firm — Office of Carl Giordano, PC

(57) ABSTRACT

A simplified rimless or semi-frame eyewear is disclosed. The eyewear comprises a frame and a pair of lenses that slide into or engage a slotted connection in the frame. The lenses are held in place in a corresponding frame with a locking design or an adhesive. An example of a locking mechanism is a screw connector that may be incorporated into the frame to lock the lens in place.

17 Claims, 9 Drawing Sheets

FIG. 1
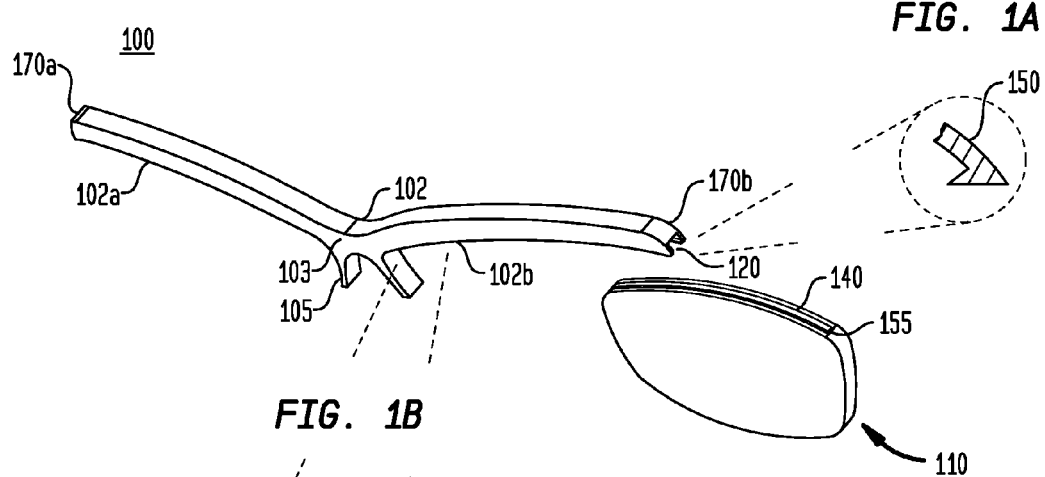
FIG. 1A
FIG. 1B
FIG. 2
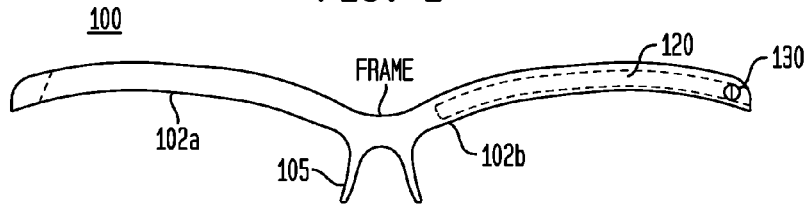

"O" RING GROOVE

DOVETAIL

"T" GROOVE

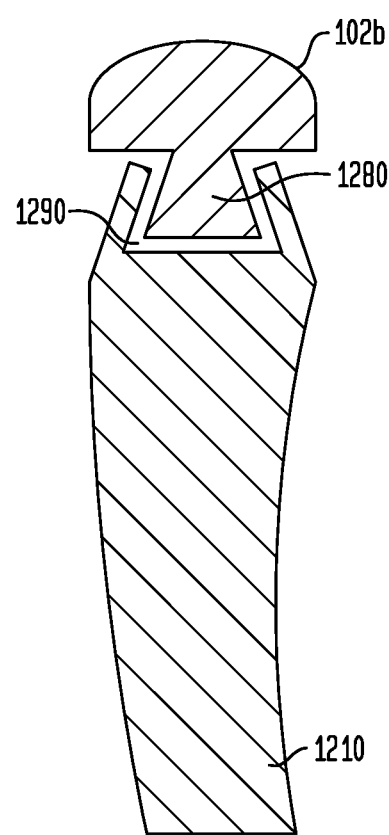

RIMLESS EYE WEAR

CLAIM OF PRIORITY

This application claims priority to, and the benefit of the earlier filing date, of that patent application entitled "Rimless Eye Wear and Method for Manufacture Same," filed on Dec. 28, 2015 and afforded Ser. No. 62/387,620, the contents of which are incorporated by reference herein.

FIELD OF THE INVENTION

The application relates to the field of eyewear/eyeglasses and specifically with regard to a rimless eye wear.

BACKGROUND OF THE INVENTION

Eyewear is a multi-million dollar industry that continues to generate new designs suitable to combine fashionable statement with functional practicality. Numerous types of eyewear are currently available. Full frame glasses, for example, surround the lens to hold the lens in place, and provide the greatest stability for holding the lens.

Fashion designers have a continued desire to reduce the visual appearance of the eyewear on the user. One of the existing rimless designs in use today is the nylon rimless, semi-frame eyewear, wherein a lens is held into a top portion of a flexible material frame by a nylon string inserted in a bottom groove of the lens. However, there many issues involved is this type of design. For example, it is known that a lens may pop out and without the required machines it is extremely difficult to re-insert the lens. Another issue is that undue pressure on the lens causes aberration and loss of vision. This prevents a user's use of expensive nylon rimless eyewear in many situations.

Another rimless eyewear today is referred to as a three piece drilled mount rimless concept. However, all optical practitioners are aware of the limitations of this type of lens that present endless issues. For example, drilled lenses compromise the infrastructure of the lenses, and applying pressure such as stress and distortion on the lenses distort the optical properties that impedes the patient's vision.

Another related issue arises when screws inserted in the lens cause cracks in the lenses in everyday use. Lastly, the screws may loosen causing lens to fall out.

In conclusion, the manufacture of present day semi-frame rimless eyewear is expensive and there are a number of known problems with this type of eye wear.

Thus, there is a need to avoid the many negative issues arising from conventional rimless eyewear construction and there is a need for an eyewear that will lower cost to dispense in a practical way and offer quality good looking rimless eyewear to the general public.

SUMMARY OF THE INVENTION

It is therefore an objective of the present invention to provide semi-frame eyewear and a method of manufacturing semi-frame eyewear in a simpler manner. The present invention refers to a semi-frame eyewear comprising a frame and a pair of lens that slide into or engage a slotted connection in the frame. In accordance with the principles of the invention, the lens simply slides into the corresponding frame and is held in place with a locking design. An example of a locking mechanism is a screw connector may be incorporated into the frame that engages the lens and locks the lens in place.

In one aspect of the invention, the lens may be formed or machined to contain an extension member that engages a corresponding containing member within the frame. In one aspect of the invention, the formation (i.e., extension member, engagement member) in the lens may, for example, be one of a dovetail, a T-slot, a groove, a protrusion and an O-ring whereas the frame may include an opposing slotted connection in a corresponding form (e.g., a dovetail, a T-slot, a protrusion, a groove, an O-ring). In another aspect of the invention, the slot within the frame may include a soft material, e.g., a rubber, silicon or polymer, that may provide a means to facilitate the engagement of the extension member within the slot and further compensate for any tolerance errors in the formation of the slot or the lens extension member. In one aspect of the invention, the use of a silicon material is advantageous as it is initially liquefied (or semi-liquified) and malleable and hardens when dry.

In another aspect of the invention, the material may be a heat sensitive material, which may be malleable (i.e., adaptable) when heated and then stiffened or hardened when cooled. With the incorporation of a malleable material, a lens may be inserted into the frame when the material is heated and then retained in place when the material cools. In another aspect of the invention, the lens may be held within the slotted frame by the application of an adhesive (e.g., a liquid, heat activated, etc.) within the slot. In another aspect of the invention, the extension member of the lens may have a snap-in (or a snap-fit) connection to a corresponding slot in the frame, wherein the lens is held in place by the friction between the lens and the frame. In still another aspect, the lens may have a single groove in one side of the lens. The single groove may engage a matching protrusion within the frame. The second side of the lens, which is not machined, may then be slide into the frame slot and held in place, as previously disclosed with a heat-sensitive material (e.g., a polymer) and/or an adhesive (i.e., liquid, heat-activated). Alternatively, the lens may have a protrusion formed on a first side of the lens and the frame may have a matching groove, wherein after inserting the protrusion into the groove in the frame, the second side of the lens may then be slide into the frame slot and held in place with a heat sensitive material and/or an adhesive.

BRIEF DESCRIPTION OF THE DRAWINGS

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice and the drawings are not drawn to scale. In the accompanying drawings:

FIG. 1 illustrates perspective exploded rimless eyewear in accordance with the principles of the invention.

FIG. 1A illustrates an exploded view of an end of the eyewear shown in FIG. 1.

FIG. 1B illustrates an exploded view of a bridge element of the eyewear shown in FIG. 1.

FIG. 2 illustrates a front view of the eyewear shown in FIG. 1.

FIG. 12 illustrates a cross-sectional view of an exemplary eyewear configuration in accordance with another embodiment of the invention.

Figure 5:
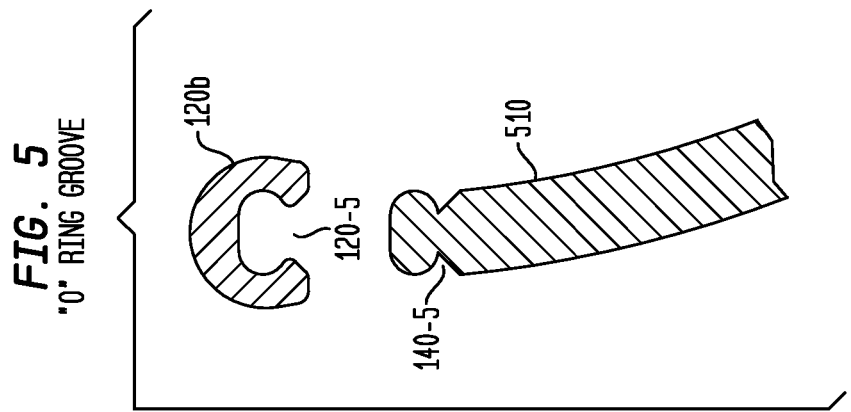
FIG. 5 illustrates a cross-sectional view of an exemplary eyewear configuration in accordance with the principles of the invention.

It is noted that the drawings of the invention are not to scale. The drawings are intended to depict only typical aspects of the invention, and therefore should not be considered as limiting the scope of the invention. In the drawings, like numbering represents similar or like elements between the drawings.

It is to be understood that the figures and descriptions of the present invention described herein have been simplified to illustrate the elements that are relevant for a clear understanding of the present invention, while eliminating, for purposes of clarity, many other elements. However, because these elements are well-known in the art, and because they do not facilitate a better understanding of the present invention, a discussion of such element is not provided herein. The disclosure herein is directed also to variations and modifications known to those skilled in the art.

DETAILED DESCRIPTION OF THE PRESENT INVENTION

FIG. 1 illustrates an exploded perspective of eyewear 100 in accordance with the principles of the invention wherein the eyewear 100 comprises a frame 102, composed of a left side 102a and a right side 102b, joined together by a bridge element 103. Although not shown it would be known in the art that the eyewear generally includes temples (i.e., a term of art) that extend from the frame 102 to engage a user's ears so as to retain the eyewear 100 on the user. It would be recognized that the materials utilized for frame construction may be of a plastic, a composite material, a metal material and/or combinations of these materials. The composition of the plastic and/or composites and/or metals utilized for frame construction is similarly well-known in the art and need not be discussed in detail herein.

Further shown is slot 120 shown at an end of the right side 102b. Slot 120 will be discussed in more detail.

Further shown is lens 110 situated to engage the right side 102b of frame 102. Although only a single lens is shown, it would be recognized that the eyewear is composed of two lenses. It would be further recognized that the lens may be constructed from a plastic material and/or a glass material. The composition of the plastics and/or glass material for the construction of the lens 110 is well-known in the art and need not be discussed in detail herein. In one aspect the lenses may be contrasted to have a fixed magnification (i.e., reading glasses with magnifications such as 1.25, 1.5, 1.75 etc.). Alternatively, the lens may be medically required, prescriptive, lens, which are custom manufactured for a client.

Further shown is an extension or engagement means 140 along a top edge of the lens 110. Engagement means 140 engages slot 120 to retain lens 110 to frame 102, as will be discussed.

FIG. 1A discloses an exploded view of an end of the right side 102b of the frame 102, which illustrates an edge connection 150 (i.e., a clip) at a free end 170b that locks lens 110 into frame 102 after the lens has been placed within the slot. The edge connection 150 may be connected within slot 120 by a hinge connection (not shown), which when the clip is placed in an up position, lens 110 may slide into slot 120. Whereas when the clip 150 is placed in a down position, the clip 150 engages an edge 155 of engagement means 140 or an edge of lens 110 to retain lens 110 within slot 120.

FIG. 1B illustrates a exploded view of an internal surface of the nose element 105 of right side 102b showing slot 120 extending from the free outer edge of the right side 102b of frame 102 to nose element 105. The engagement of lens 110, when desired, with the portion of the slot in nose element 105 provides for stability of the lens within frame 102. Further shown is an adhesive that may be included in slot 120 to provide for greater retention and stability of lens 110 within slot 120, as will be discussed.

In one aspect of the invention, slot 120 extends substantially from a free (outer) end 170a, 170b of a corresponding left section 102a and right section 102b of frame 102 to the bridge section 103. In a further aspect of the invention, the slot 120 may extend substantially from the free end 170a, 170b of a corresponding left section 102a and right section 102b to substantially the nose element 105. Furthermore, the engagement element 120, which extends along a top portion of lens 110, may engage all, or a limited portion, of a corresponding slot 120 in left section 102a and right section 102b. That is, the insertable engagement means 140 may in one aspect of the invention, extend substantially to the bridge section from substantially near the free end (170a, 170b) of the corresponding section. Alternatively, the insertable engagement means 140 may extend to the nose element 105 from the free end of the corresponding section or substantially near the free end of the corresponding section.

FIG. 2 illustrates a front view of frame 102 showing slot 120, in hidden view lines, within right side 102b. It would be recognized that a similar slot is contained in left side 102a.

Further shown is a screw 130, which may be included in an end of the frame 102. Screw 130 may be used to retain lens 110 (not shown) in frame 102 after lens 110 is slide or placed within slot 120.

Although a single screw is show located on a front surface of the frame near the temple, it would be recognized that the one or more screws may be incorporated into the frame at different locations on the frame. For example, a screw may be incorporated along a top of the frame 102 or may be incorporated in a back surface of frame 102. Furthermore the one or more screws may be located near the bridge, near the free end and/or distributed along the frame.

Figure 3:
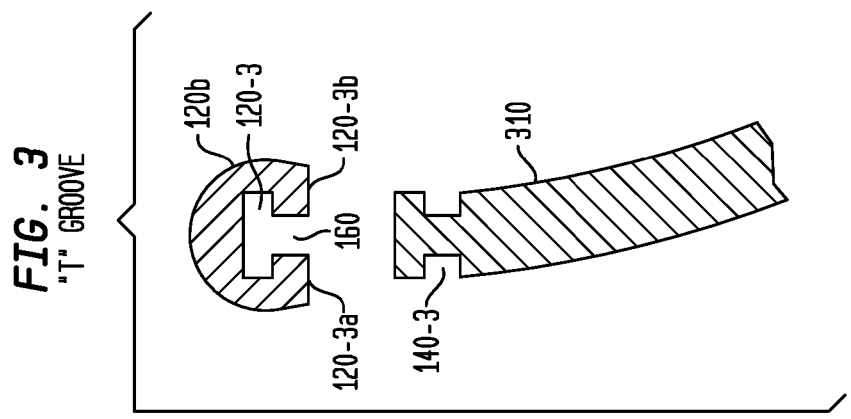
FIG. 3 illustrates a cross-sectional view of exemplary eyewear configuration in accordance with the principles of the invention.

FIG. 3 illustrates an end view of a first exemplary embodiment of a frame and lens in accordance with the principles of the invention.

In this illustrated embodiment, the slot 120 (referred to as 120-3) within frame 102b is represented as a T-slot connection. T-slot connections are well known in the art and receive their name, generally, based on the matching engaging connection; in this case engagement connection 140-3, formed in lens 310, which has a shape of a "T." As shown, the slot 120-3 is formed with two protrusions 120-3a, 120-3b extending into slot 120-3 such that the entrance 160 into slot 120-3 is narrower than the main portion of slot 120-3.

The engagement connection 140-3 may, thus, be slide into slot 120-3 so that lens 310 is retained in place. Lens 310 may further be retained in place by the clip 150 (shown in FIG. 1A) or screw 130 (shown in FIG. 1B), or by an adhesive, as discussed.

Figure 4:
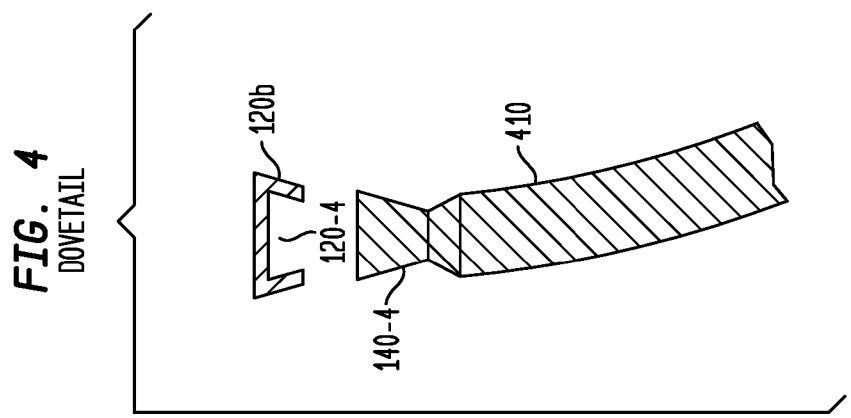
FIG. 4 illustrates a cross-sectional view of an exemplary eyewear configuration in accordance with the principles of the invention.

FIG. 4 illustrates an end view of a second exemplary embodiment of a frame and lens in accordance with the principles of the invention.

In this illustrated embodiment, the slot 120 (referred to as 120-4) within frame 102b is represented as a dovetail connection. A dovetail connection is well known as a means for achieve a tight fit between two elements. In this illustrated embodiment, the lens 410 includes a matching dovetail connection 140-4 that engages the dovetail shaped slot 120-4. The engagement connection 140-4 may be slide into slot 120-4 so that lens 410 is retained in place. Lens 410 may further be retained in place by the clip 150 (shown in FIG. 1A), screw 130 (shown in FIG. 1B), and/or an adhesive, as discussed.

As discussed with regard to the engagement means shown in FIG. 3, the entrance to the slot 120-4 is narrower than the slot 120-4.

FIG. 5 illustrates an end view of a third exemplary embodiment of a frame and lens in accordance with the principles of the invention.

In this illustrated embodiment, the slot 120 (referred to as 120-5) within frame 102b is referred to as an O-ring connection. In this case, the O-ring connection is defined as being similar to the T-slot connection shown in FIG. 3, wherein protrusions extend from a lower edge of the forward and rear section of the slot. The O-ring connection, similar to the connections shown in FIG. 3 and FIG. 4 allows the lens 510 to slide into slot 120-5 to retain lens 510 into frame 102b. The O-ring connection is advantageous as, like its name implies, it has substantially rounded edges, which reduces stress points on the frame 102 and/or the lens 510. Lens 510 may further be retained in place by the clip 150 (shown in FIG. 1A), a screw 130 (shown in FIG. 1B), and/or an adhesive, as previously discussed.

As is shown in FIGS. 3-5 a characteristic of the illustrated slots is that a width of corresponding slot at its lower edge (i.e., an entrance) represents the smallest width of the slot. The width of the slot at its lower is narrowed by, in the case of FIGS. 3 and 5, protrusions extending inward from the lower edge of the slot. In the case of FIG. 4, the width of the slot at its lower edge is narrowed by the triangular shape of the dovetail.

Although, FIGS. 3-5 illustrate a slot 120 that is internal within frame 102 and an engagement means 140 extending (projecting) from lens 110 wherein the engagement means is inserted into slot 120, it would be recognized that the engagement means 140 may be incorporated into the frame 102 and the slot 120 may be incorporated into lens 110 without altering the scope of the invention. Rather such a configuration has been contemplated and considered to be within the scope of the invention claimed.

Figure 6:
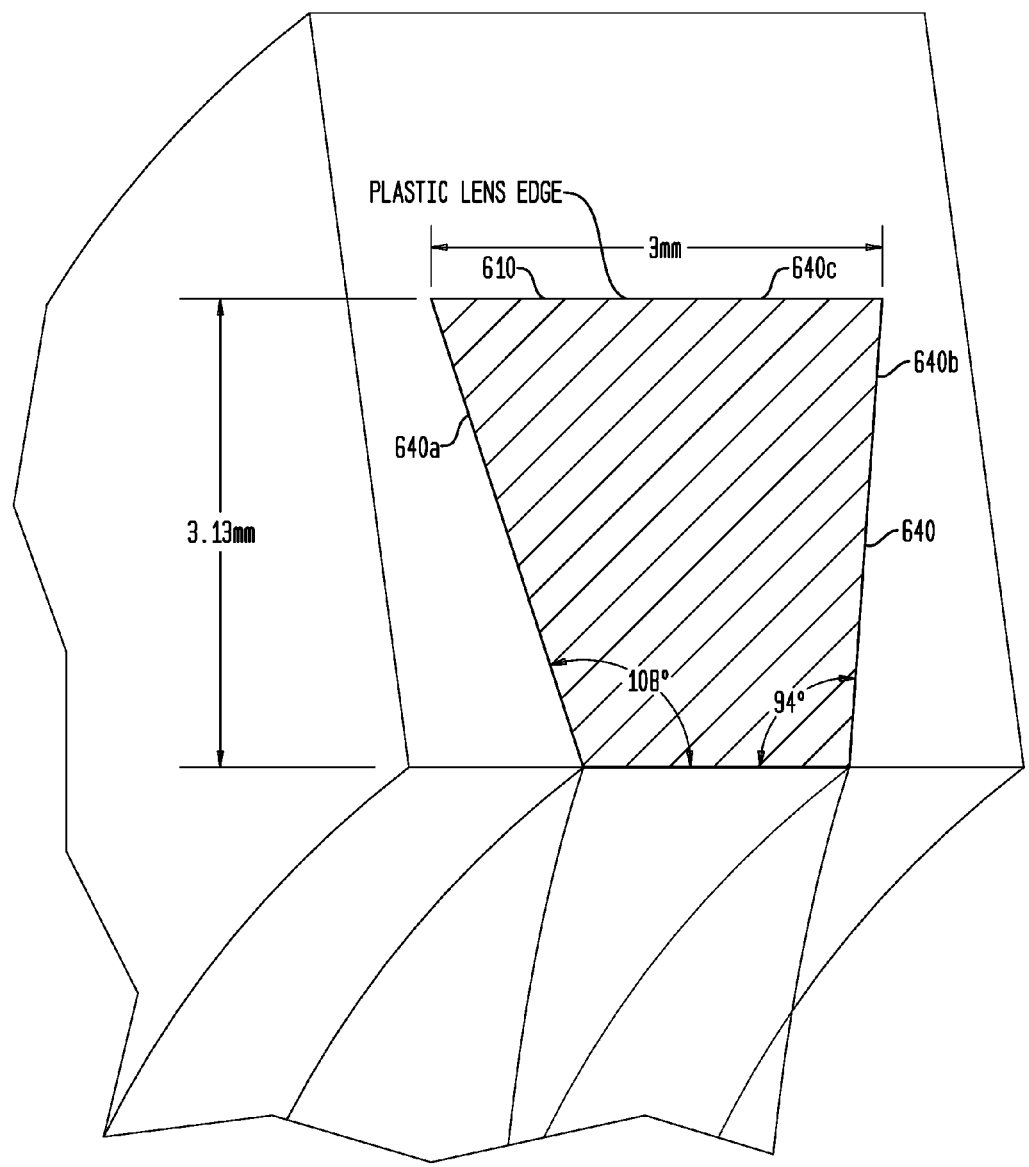
FIG. 6 illustrates a cross-sectional view of an exemplary configuration of the dovetail configuration shown in FIG. 4 in accordance with the principles of the invention.

FIG. 6 illustrates an exemplary example of a dovetail connection 640 in accordance with the principles of the invention.

In this exemplary example, the dovetail engagement means 640, similar to dovetail 140-4 shown in FIG. 4, has a first facet 640a machined or formed at substantially an angle of 108 degrees with respect to a horizontal edge that is substantially parallel to a top edge 640c of the lens 610. Further shown, is a rear facet 640b machined or formed at substantially an angle of 94 degrees with respect to the horizontal edge. The different angles for the front and rear facets are exemplary angles and are only used for the purpose of illustrating the dovetail connection in further detail. It would be appreciated that the front facet and rear facet angles may be the same or may be different. The difference in the formation of the front and rear facets may, for example, be determined based on the type, and angle, of frame 102 in which the slot 120 is formed.

Figure 7:
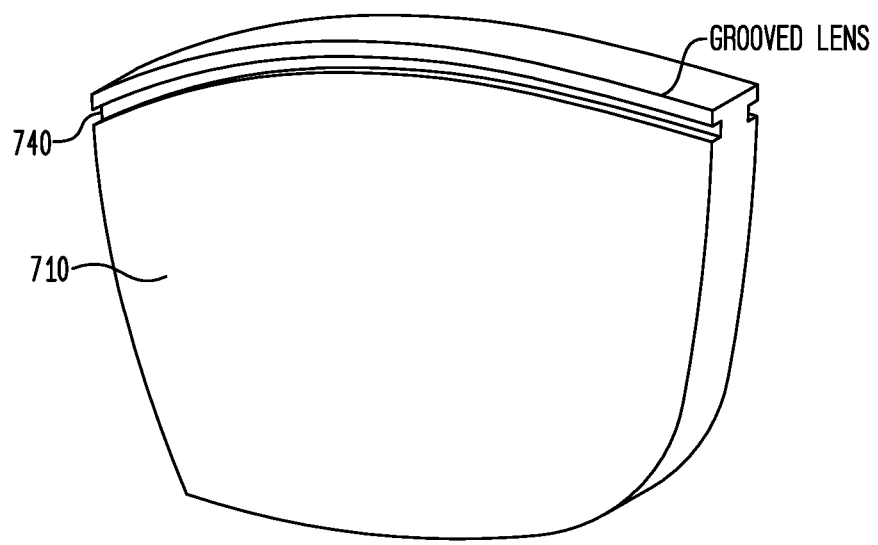
FIG. 7 illustrates a perspective view of a lens configuration in accordance with another aspect of the invention.

FIG. 7 illustrates a prospective view of an exemplary lens in accordance with another aspect of the invention.

Figure 8:
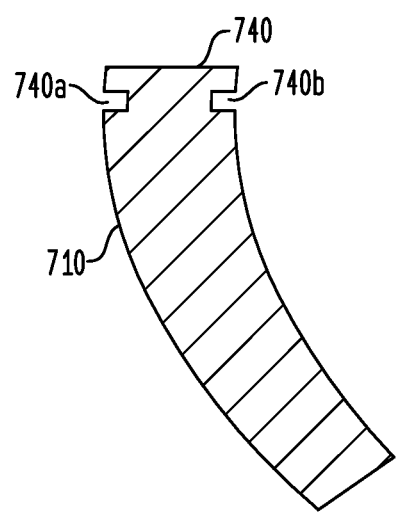
FIG. 8 illustrates a cross-sectional view of the lens shown in FIG. 7.

In this illustrated aspect, a groove 740 may be machined or formed in one of a front side and a rear side of the lens 710. In this illustrated case, the groove 740 may be squared or rounded. When the groove 740 is squared, then the incorporation of the groove 740 on both a front side and a rear side of the lens, may form a T-slot connection, similar to that should in FIG. 3 and in FIG. 8. When the groove 740 is rounded and the incorporation of the rounded groove 740 is on both the front side and the rear side of the lens, a O-ring connection, similar to that should in FIG. 5 may be formed.

The use of groove in forming or machining the engagement means 140-3/140-5 may be advantageous over forming the T-slot 140-3 or the O-ring 140-5 using a single machining tool. In the later case, a top edge of the lens may be routed (machined) to form a T-slot, for example, in a single pass, whereas in the former case two passes of a same tool may be used to form a groove in the front and the rear side of the lens, respectively.

Figure 9A:
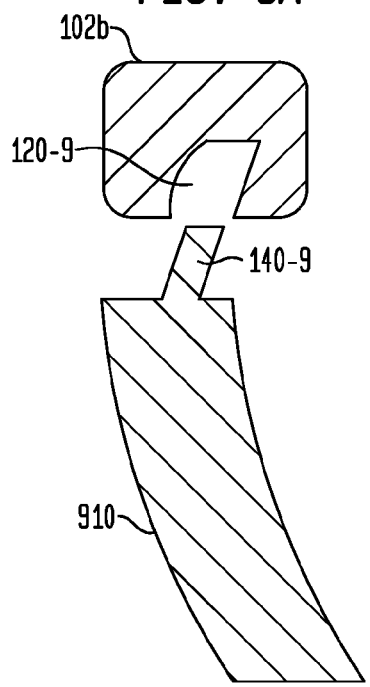
FIGS. 9A and 9B illustrate cross-sectional views of an exemplary eyewear configuration having a snap-fit connection in accordance with the principles of the invention.
Figure 9B:
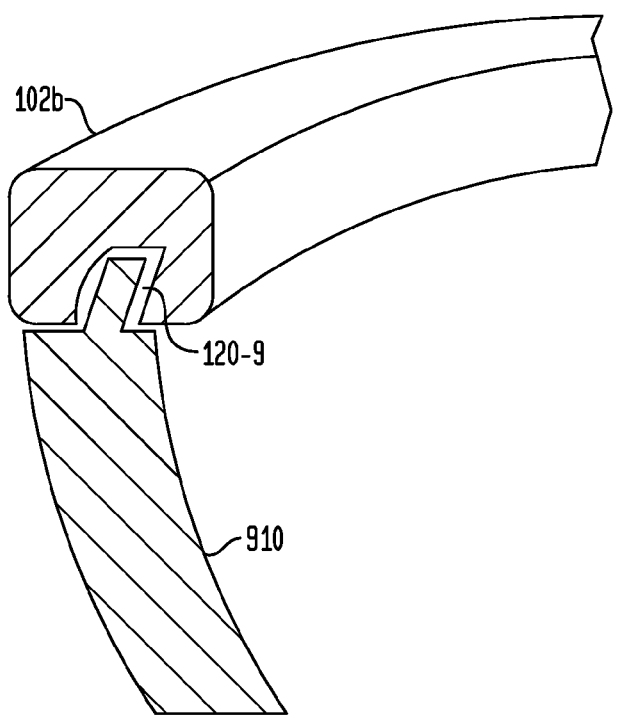

FIGS. 9A and 9B illustrate side views of another aspect of the invention, wherein an engagement element 140-9 of lens 910 has a snap-fit or snap-in connection to slot 120-9. Generally, in a snap-fit connection the engagement element 140-9 is forced into slot 120-9, such that engagement element 140-9 is held in place by friction. Alternatively, an adhesive or other bonding material may be used to retain the lens 910 in slot 120-9. As previously discussed, the adhesive may be a liquid or a heat sensitive polymer that is soft and malleable when heated and rigid when cooled.

As would be appreciated, when an adhesive is used to retain the lens 910 in slot 120-9, the size of slot 120-9 may be slight larger to allow the engagement means 140-9 to be slid into slot 120-9 easier.

In another aspect of the invention, a rubber or similar malleable material may be incorporated into slot 120-9 (or the other slots disclosed) to allow engagement means 140-9 to easily be slid into slot 120-9. An adhesive may then be used to attach the engagement means 140-9 to the incorporated rubber or similar material.

Figure 10:
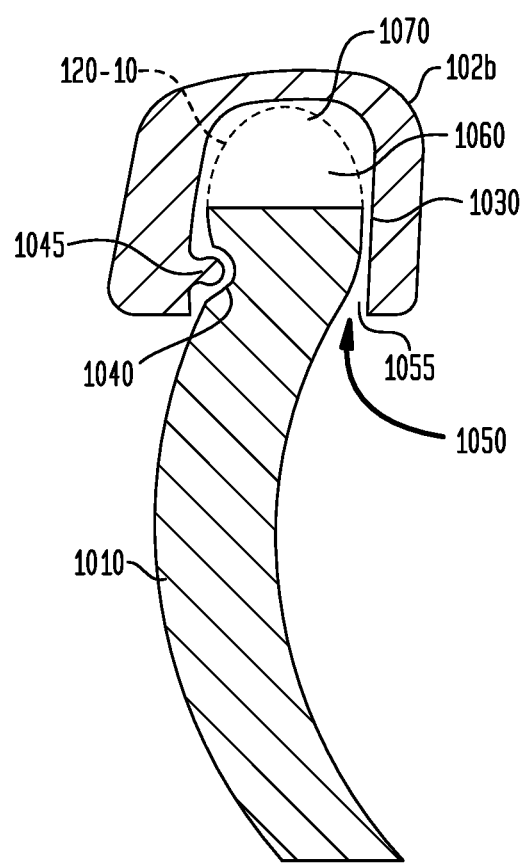
FIG. 10 illustrates a cross-sectional view of an exemplary eyewear configuration having a tongue/groove connection in accordance with the principles of the invention.

FIG. 10 illustrates a cross-sectional view of still another exemplary embodiment of the invention.

In this illustrated embodiment, a groove 1040, similar to groove 740, may be machined and/or formed in one side of lens 1010. In this illustrated example, the groove 1040 is formed on a front surface of lens 1010. The groove 1040 may engage a protrusion 1045 (i.e., a tongue) extending from a corresponding lower end of frame 102 (in this case right side of frame 102b). The protrusion 1045 is similar to the protrusions shown in FIG. 3 and FIG. 5. In this illustrated example, the protrusion 1045 is similar to the protrusion shown in FIG. 5, wherein the protrusion 1045 and groove 1040 have matching rounded edges. As previously discussed, rounded edges are useful in reducing stress points that may occur in the frame 102 and/or the lens 1010.

In this illustrated case, the entrance to slot 102-10 is narrower than that of slot 102-10 by protrusion 1045 extending from a lower edge into slot 102-10. Hence, the width of the slot at its the lower edge is less than a width of the slot, as previously discussed.

Further shown is a rear surface 1050 of lens 1010 that is substantially flat. Similarly, a rear inner surface 1030 of slot 102-10 within frame 102b is correspondingly flat. In this illustrated case, as the groove 1040 of lens 1010 is inserted into slot 120-10 to engage protrusion 1045, the rear surface 1050 of lens 1010 may be positioned along interior surface 1030 of slot 120-10. The position of rear surface 1050 with respect to internal surface 1030 may be set such that a desired angle of lens 1010 with respect to frame 102 may be achieved. That is, lens 1010 may essentially pivoted about protrusion 1045 such that the rear surface 1050 may contact surface 1030 at one of a plurality of points.

After a desired angle of lens 1010 with respect to frame 102 (e.g., section 102b) is achieved, lens 1010 may be fixed or retained in place within slot 120-10 by an adhesive, for example, or other similar retaining medium. Similarly, and as previously discussed, the space 1060 within slot 120-10 may be filed with a polymer material, which is malleable when heated and becomes rigid when cooled. The polymer material may fill the space 1055 between rear surface 1050 and surface 1030 (and any unoccupied space within slot 120-10). The polymer material, when cooled, may provide stability and adhesion of the lens 1010 with frame 102 (right section 102b).

Although not drawn to scale, a space 1060 within slot 120-10 may be filed with an insert material, such as rubber or a malleable material (e.g., a polymer). In one aspect of the invention, a rubber or a malleable material may be sprayed, for example into slot 120-10 (or any of the slots previously discussed) to provide a layer (a lining) 1070 of flexible material that lines the inner surface of slot 120-10 (or any of the slots previously discussed). The lining material is advantageous as to compensate for tolerance errors caused during manufacturing process of the frame and/or the lens, to reduce stress between the lens 1010 and the frame 102 (102b), to allow the lens 1010 to slide within slot 120-10 and to provide an adhesive layer that retains lens 1010 within slot 120-10.

Figure 10A:
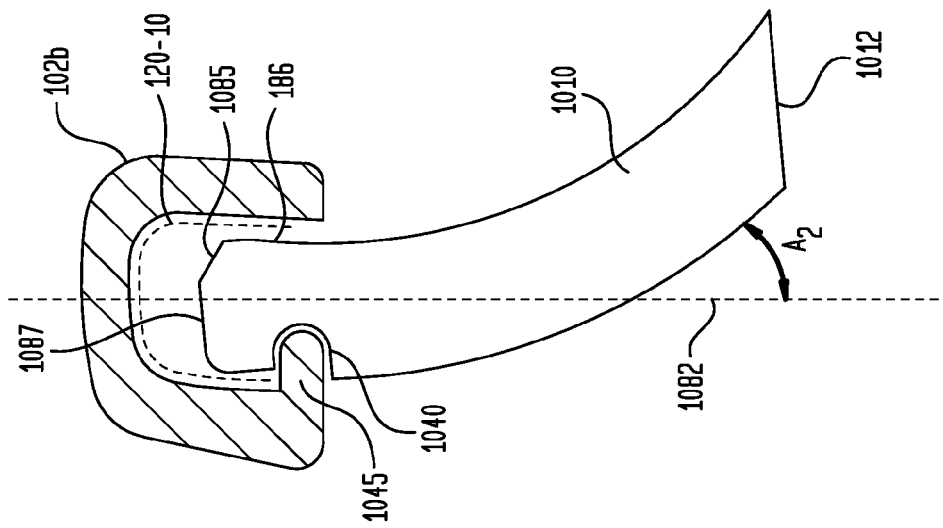
FIGS. 10A and 10B illustrates cross-sectional views of the exemplary eyewear configuration shown in FIG. 10.
Figure 10B:
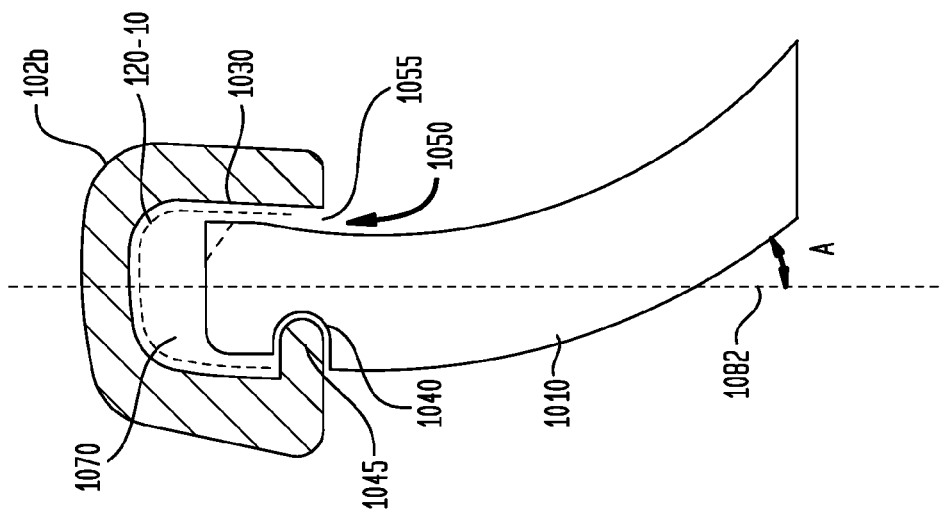

FIGS. 10A and 10B illustrate cross-sectional views of the exemplary embodiment of the invention shown in FIG. 10.

FIG. 10A illustrates a first example, wherein lens 1010 is inserted into slot 120-10 within frame right section 102b such that the lens 1010 forms an angle, A, with respect to frame 102, as represented by axis 1082.

FIG. 10B illustrates a second example, wherein lens 1010 is inserted into slot 120-10 within frame section 102b such that lens 1010 forms an angle, $A_2$, with respect to axis 1082.

Angle A2 represents an incremental increase in angle A caused by the rear surface 1050 of lens 1010 being positioned further within slot 120-10 than in FIG. 10A.

The ability to alter the angle of the lens 1010 with respect to frame 102 is advantageous as a lower edge 1012 of lens 1010 may be brought closer to a user's face, which prevents the user from viewing the lower edge 1012 of the lens. As shown, an upper edge of a rear surface 1030 of lens 1010 may include a chamfer 1085, which removes the generally right angle corner between the rear surface 1030 of lens 1010 and the upper edge 1087 of lens 1010. The addition of the chamfer 1085 enables the rear surface 1050 of lens 1010 to be positioned higher along the interior surface 1030 within slot 102-10. In another aspect, the interior surface of 1030 may similarly be chamfered, 1086, to allow lens 1010 to move backward as lens 1010 is positioned higher along interior surface 1030. An adhesive may be included within a space between rear surface 1030 and interior surface 1050 to retain the lens in place.

Figure 11:
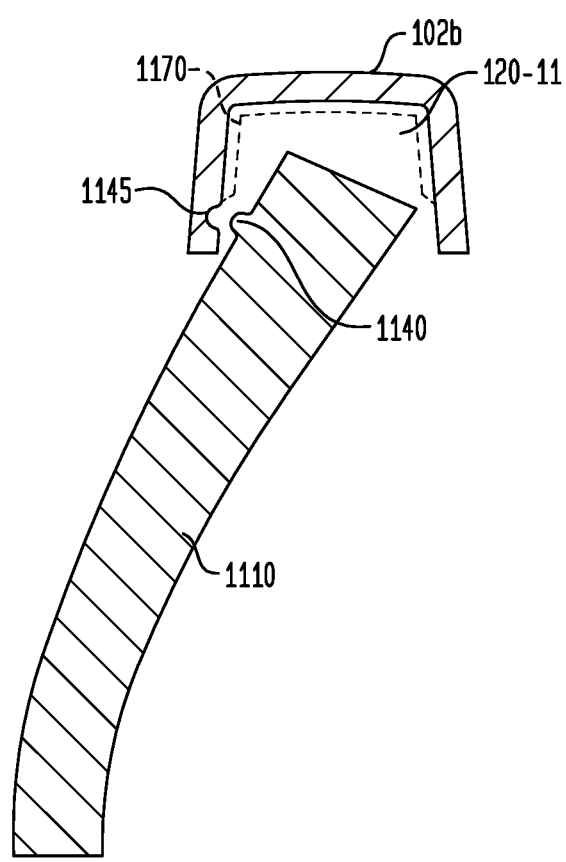
FIG. 11 illustrates a cross-sectional view of an exemplary eyewear configuration having a tongue/groove connection in accordance with the principles of the invention.

FIG. 11 illustrates a cross-sectional view of another aspect of a tongue/groove eyewear configuration in accordance with the principles of the invention.

In this illustrated embodiment frame 102 (section 102b) and lens 1110 are similar to corresponding elements discussed previously.

Further illustrated is a groove 1145 formed in a first surface (e.g., a front internal surface) of slot 102b and a matching protrusion (i.e., tongue) 1140 on lens 1110. The protrusion 1140 on lens 1110 may be formed by applying a material (e.g., a silicon) that hardens when dry. Or the tongue may be formed within the glass and/or plastic from which the lens 1110 is formed.

Lens 1110 may be positioned within slot 120-11 by sliding protrusion 1140 along groove 1145. Alternatively, and as illustrated, lens 1110 may be positioned to have tongue 1140 engage groove 1145 and then tilted upward so that a rear surface of lens 1110 may engage a second internal surface of slot 120-11. As discussed with regard to FIG. 10, lens 1110 may be retained in a desired angular orientation with respect to frame 102 by applying an adhesive to the rear surface of lens 1110. Furthermore an insert material, illustrated as a lining 1170 may be formed on the inner surfaces of slot 120-11 to fill regions between lens 1110 and slot 120-11.

FIG. 12 illustrates a cross-section view of another exemplary embodiment of the invention, wherein the insertable engagement means 1280 is incorporated in the frame 102 (right section 102b) and the slot is formed in lens 1210.

In this illustrates embodiment, the engagement means 1280 and the slot 1290 are similar to previously discussed engagement means and slots. In this case, the slot 1290 is slide along the engagement means 1280. As previously discussed, an adhesive may be used to retain the lens in position with the frame. Or a heat sensitive polymer may be included within the slot, wherein the polymer is malleable when heated and rigid when cooled.

To summarize the principles of the invention, the invention describe herein is an eyewear comprising a frame comprising a first section and a second section joined together by a bridge element, the bridge element including a nose element extending downward therefrom, each of the first section and the second section including a slot therein, wherein a width of an entrance to the slot is narrower than a width of the slot; and a lens associated with each of the first section and the second section, each lens comprising a main portion and a deformation of the main portion along an upper section of the main portion, wherein the deformation decreases a width of the main portion, the decrease in width being comparable to the width of the slot entrance. Furthermore, the width of the slot is narrowed by at least one protrusion extending from a corresponding lower edge of the frame, wherein the at least one protrusion is one of: a square protrusion, a triangular protrusion and a rounded protrusion. In accordance with the principles of the invention, an upper edge of each lens includes a chamfer and a lower edge of the first section and the second section of the frame may similarly include a chamfer. The eyewear disclosed may further include an insert material within a slot within each of the first section and the second section, wherein the insert material is one of: a rubber, a silicon, neoprene and a malleable material. The eyewear may further include a retaining element configured to retain the lens within a corresponding slot, the retaining element may be one of the insert material, an adhesive, a clip, a screw and a heat sensitive polymer.

Although the invention has been described with regard to preferred embodiments of the invention claimed, it is expressly intended that all combinations of those elements that perform substantially the same function in substantially the same way to achieve the same results are within the scope of the invention. Substitutions of elements from one described embodiment to another are also fully intended and contemplated.

The terms "a" or "an" as used herein are to describe elements and components of the invention. This is done merely for convenience and to give a general sense of the invention. The description herein should be read to include one or at least one and the singular also includes the plural unless indicated to the contrary.

The term "comprises", "comprising", "includes", "including", "as", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

What is claimed is:

1. A rimless eyewear comprising:
    a frame section comprising:
        a bridge section;
        a left section; and
        a right section, the left section and the right section attached to opposite ends of the bridge section, each of the left section and the right section comprising a slot formed therein, the slot extending from substantially a free end of a corresponding section to substantially the bridge section, wherein a width of a lower edge of a corresponding slot is less than the width of the slot,
        flexible lining element contained within each of the left section slot and the right section slot, said lining element covering an inner surface of a corresponding slot; and
    a first lens configured to attach to the left section; and
    a second lens configured to attach to the right section, each of the first lens and the second lens includes an engagement means formed along a corresponding upper edge wherein the engagement means is configured to:
        engage the flexible lining element within a corresponding slot from substantially the free end of the corresponding section to substantially the bridge section to retain a corresponding one of the first lens and the second lens therein; and
    a retaining means configured to retain the first lens and the second lens in corresponding ones of the left section and the right section.

2. The eyewear of claim 1, wherein the lining element is one of: a rubber material, a neoprene material, and a silicon material.

3. The eyewear of claim 1, wherein the slot in each of the left section and the right section is one of: a T-slot, a dovetail, and an O-ring.

4. The eyewear of claim 3, wherein the engagement means on a corresponding lens is a corresponding one of: a T-slot, a dovetail, and an O-ring.

5. The eyewear of claim 4, wherein the dovetail comprises a front facet angle and a rear facet angle that are one of: equal and different.

6. The eyewear of claim 1, the retaining means is one of: an adhesive, a heat-sensitive polymer material, a screw and a clip.

7. The eyewear of claim 1, wherein the engagement means is a snap-fit connection between the slot in a corresponding one of the left section and the right section.

8. The eyewear of claim 1, wherein the slot in a corresponding one of the left section and the right section comprises:
    a protrusion extending from a lower edge of a first inner surface the slot; and
    a flat surface; and
    the engagement means comprises a groove within a corresponding lens, wherein the groove within the lens engages the protrusion in the slot.

9. The eyewear of claim 1, wherein the slot in a corresponding one of the left section and the right section comprises:
    a groove in a first inner surface the slot; and
    a flat opposite second surface; and
    the engagement means comprises a protrusion on a corresponding lens, wherein the protrusion of the lens engages the groove in the first inner surface.

10. An eyewear configuration comprising:
    a frame comprising:
        a first section and a second section joined together by a bridge element, the bridge element including a nose element extending downward therefrom, each of the first section and the second section including a slot therein, wherein a width of an entrance to the slot is narrower than a width of the slot;
    a flexible insert material along inner surface of each of the first section slot and the second section slot; and
    a lens associated with each of the first section and the second section, each lens comprising:
    a main portion; and
    a deformation of the main portion along an upper section of the main portion, wherein the deformation decreases a width of the main portion, the decrease in width being comparable to the width of the slot entrance.

11. The eyewear of claim 10, wherein the width of the slot is narrowed by at least one protrusion extending from a corresponding lower edge of the frame.

12. The eyewear of claim 11, wherein the at least one protrusion is one of: a square protrusion, a triangular protrusion and a rounded protrusion.

13. The eyewear of claim 10, wherein an upper edge of each lens includes a chamfer.

14. The eyewear of claim 13, wherein an upper interior edge of each of the first section and the second section of the frame includes a chamfer.

15. The eyewear of claim 10, wherein the insert material is one of: a rubber, a silicon, and a neoprene.

16. The eyewear of claim 10, wherein the slot extends substantially a length of a corresponding one of the first section and the second section.

17. The eyewear of claim 10 further comprising:
a retaining element configured to retain the lens within a corresponding slot.

* * * * *